US007953186B2

(12) United States Patent
Rosenqvist (10) Patent No.: US 7,953,186 B2
(45) Date of Patent: May 31, 2011

(54) MULTI-STAGE COMBINING WEIGHT CALCULATION METHOD AND APPARATUS

(75) Inventor: Anders Rosenqvist, Södra Sandby (SE)

(73) Assignee: Telefonaktiebolaget LM Ericsson (publ), Stocholm (SE)

( * ) Notice: Subject to any disclaimer, the term of this patent is extended or adjusted under 35 U.S.C. 154(b) by 556 days.

(21) Appl. No.: 12/040,041

(22) Filed: Feb. 29, 2008

(65) Prior Publication Data

US 2009/0220032 A1 Sep. 3, 2009

(51) Int. Cl.
*H04L 27/06* (2006.01)

(52) U.S. Cl. ...... 375/340; 375/136; 375/144; 375/147; 375/148; 375/267; 375/299; 375/316; 375/346; 375/347; 455/101; 455/132; 455/296; 455/500; 370/334

(58) Field of Classification Search ............ 375/136, 375/144, 147, 148, 267, 299, 316, 340, 346, 375/347; 455/101, 132, 296, 500; 370/334
See application file for complete search history.

(56) References Cited

U.S. PATENT DOCUMENTS

| | | | |
|---|---|---|---|
| 2005/0078742 A1* | 4/2005 | Cairns et al. | 375/148 |
| 2006/0182204 A1* | 8/2006 | Cairns et al. | 375/340 |
| 2007/0104254 A1 | 5/2007 | Bottomley et al. | |
| 2008/0152053 A1* | 6/2008 | Fulghum et al. | 375/347 |

OTHER PUBLICATIONS

Bottomley, G. et al. "A Generalized RAKE Receiver for Interference Suppression." IEEE Journal on Selected Areas in Communication, vol. 18, No. 8, Aug. 2000, pp. 1536-1545.
Kay, S.M. "Fundamentals of Statistical Signal Processing, vol. 2: Detection Theory." Prentice Hall: Upper Saddle River, NJ, 1998, pp. 478-479.

* cited by examiner

*Primary Examiner* — Leon Flores
(74) *Attorney, Agent, or Firm* — Coats & Bennett, P.L.L.C.

(57) ABSTRACT

Combining weights are calculated in multiple stages based on an overall system impairment covariance matrix and a grouping of signal processing delays. Computing the combining weights in multiple stages avoids having to invert the entire system impairment covariance matrix. Instead, smaller matrix inversions are performed. In one embodiment, a received signal is processed by calculating an impairment covariance matrix for a set of processing delays used to derive a plurality of signal values from the received signal. A set of intermediate combining weights is calculated for each of at least two different subsets of the processing delays based on the impairment covariance matrix. The signal values derived across the subsets of processing delays are combined using the sets of intermediate combining weights and the impairment covariance matrix.

21 Claims, 4 Drawing Sheets

MULTI-STAGE COMBINING WEIGHT CALCULATION METHOD AND APPARATUS

BACKGROUND

The present invention generally relates to wireless receivers, and particularly relates to calculating signal combining weights used by wireless receivers for performing symbol detection.

Some kinds of wireless receivers process received data symbols based on a system of linear equations. Take, for example, the Generalized RAKE (G-RAKE) and chip equalizer receivers. The G-RAKE receiver has a plurality of 'fingers', each finger correlating to a different delay of a received signal. A spreading waveform correlator included in each finger de-spreads its correspondingly delayed signal using an assigned channelization code. Thus, the received signal is de-spread across a plurality of processing delays. De-spread signal values output by the fingers are combined to form a decision statistic for use in symbol detection. The chip equalizer includes a multi-transversal filter having a tap point for each processing delay employed by the receiver. The delayed signal values output at the different filter taps are similarly combined to form the symbol detection decision statistic.

In both G-RAKE and chip equalizer receivers, the signal values are given by:

$$Y = Hs + U \tag{1}$$

where Y is a vector of signal values derived using f processing delays (e.g., f G-RAKE finger or filter tap delays), H is a vector of f complex channel responses, s is a symbol of interest and U is a vector of f dependent Gaussian noises (plus interference) having a corresponding impairment covariance matrix $R_u$. The signal values are conventionally combined using a vector W of combining weights calculated based on a system of linear equations. One such system of linear equations is given by:

$$W = R_u^{-1} H \tag{2}$$

Generally, the combining weights are calculated by inverting the entire impairment covariance matrix $R_u$. The number of signal processing computations needed to invert the entire impairment covariance matrix $R_u$ can range from $N^2$ to $N^3$ computations depending on how matrix inversion is performed, where N is the matrix order. Matrix order is a function of the number of processing delays employed by the receiver. For example, if ten processing delays are employed, the impairment covariance matrix is 10×10 and approximately $10^2$ to $10^3$ computations are performed to invert the matrix. In general, the computational complexity of the receiver exponentially increases as a function of the number of processing delays used by the receiver. Yet, hardware limitations restrict the computational complexity of most receivers. This in turn effectively limits the number of processing delays that can be implemented by most receivers.

SUMMARY

According to the methods and apparatus taught herein, combining weights are calculated in multiple stages based on an overall system impairment covariance matrix. The system impairment covariance matrix is calculated for processing delays employed by the system such as G-RAKE finger delays or chip equalizer filter tap delays. In a first stage, the processing delays are grouped into at least two different subsets of delays. A set of intermediate combining weights is calculated for each subset of processing delays as if each subset contained the only delays used by the receiver. Each set of intermediate combining weights is calculated using the elements of the system impairment covariance matrix that correspond to the subset of processing delays for which the set of weights is being calculated. This way, only a portion of the system impairment covariance matrix is inverted to calculate any one set of intermediate combining weights, reducing the computational complexity of the system.

The first stage ends when a set of intermediate combining weights is calculated for each subset of processing delays. Multiple intermediate combining weight calculation stages may be employed, each subsequent stage building on the results of the preceding stages. The last stage involves calculating a final set of combining weights based on the sets of intermediate combining weights calculated during the prior stage. Signal values derived across the subsets of processing delays are combined using the final set of combining weights to obtain a decision metric for aiding symbol detection.

According to one embodiment, a received signal is processed by calculating an impairment covariance matrix for a set of processing delays used to derive a plurality of signal values from the received signal. A set of intermediate combining weights is calculated for each of at least two different subsets of the processing delays based on the impairment covariance matrix. The signal values derived across the subsets of processing delays are combined using the sets of intermediate combining weights and the impairment covariance matrix.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
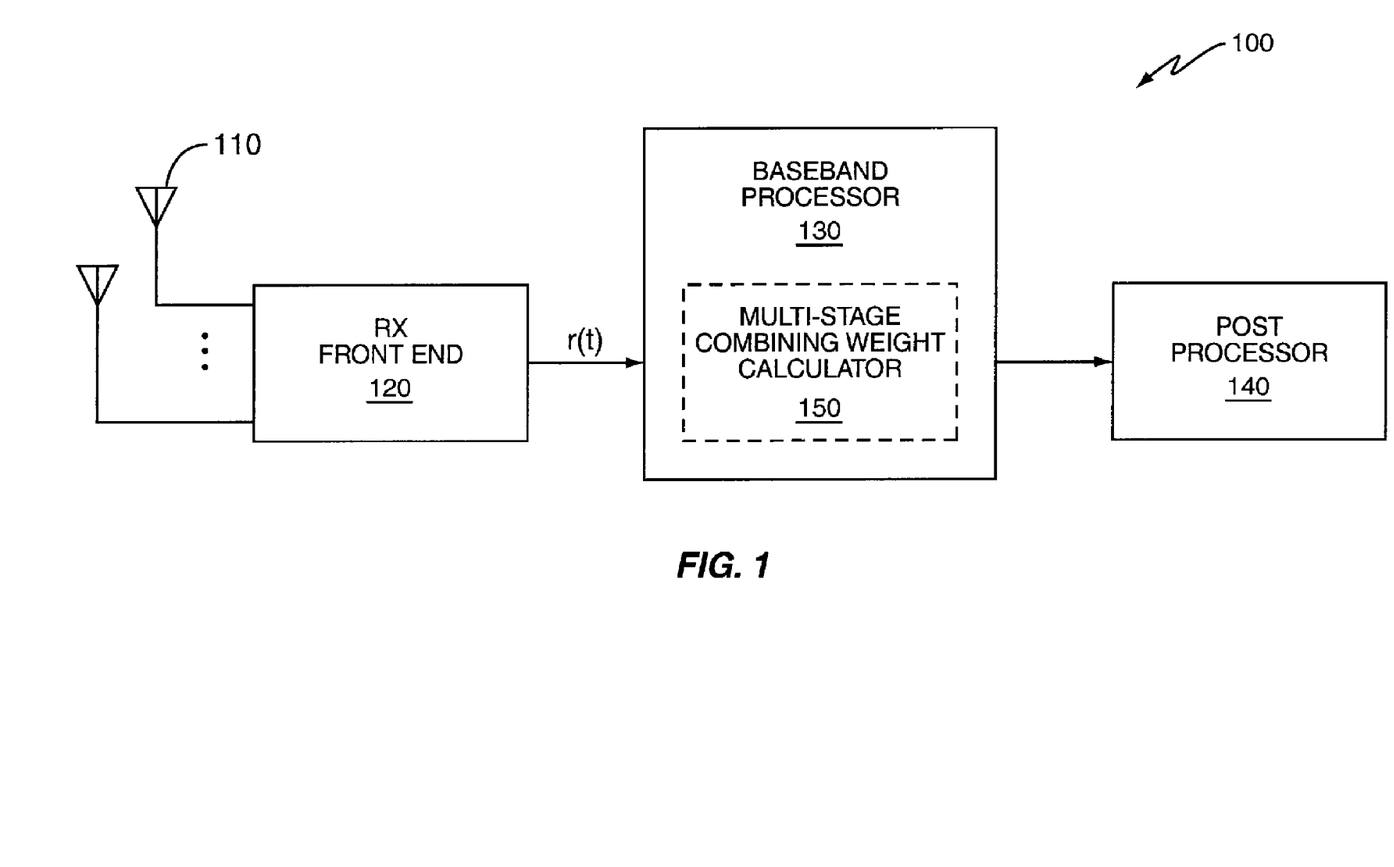
FIG. 1 is a block diagram of an embodiment of a wireless receiver including a multi-stage combining weight calculator.

FIG. 1 illustrates an embodiment of a wireless receiver 100 such as a base station, a cellular phone or other mobile communication terminal or device. The wireless receiver 100 has one or more antennas 110, front-end circuitry 120, a baseband processor 130 and a post processor 140. The antenna(s) 110 receive a signal propagated over one or more multipath fading channels. The front end circuitry 120 filters and down-converts the received signal to produce a baseband signal r(t). The signal received by the antenna(s) 110 may have propagated to the receiver 100 via a downlink communication channel or via an uplink communication channel. Regardless, the baseband processor 130 produces soft bit values (sbv) or symbol estimates from the baseband signal. The post processor 140 performs other signal processing operations on the soft bit values received from the baseband processor 130, e.g., error correction, hard-decision decoding, etc.

A multi-stage combining weight calculator 150 included in or associated with the baseband processor 130 calculates combining weights used by the baseband processor 130 to produce the soft bit values. The combining weights are generated in multiple stages based on an overall system impairment covariance matrix $R_u$ calculated by the baseband processor 130. The system impairment covariance matrix $R_u$ is calculated for a set of J processing delays used by the baseband processor 130 to derive a plurality of signal values from the baseband signal, e.g., as illustrated by Step 200 of FIG. 2. At least two different subsets of the processing delays are formed by the baseband processor 130 for use by the multi-stage weight calculator 150. In one embodiment, the baseband processor 130 correlates different ones of the J processing delays and forms the delay subsets based on the correlation results. In one embodiment, the processing delays are correlated by calculating a delay time difference between different ones of the processing delays. This way, the processing delays having the smallest delay time difference can be grouped in the same subset.

Figure 2:
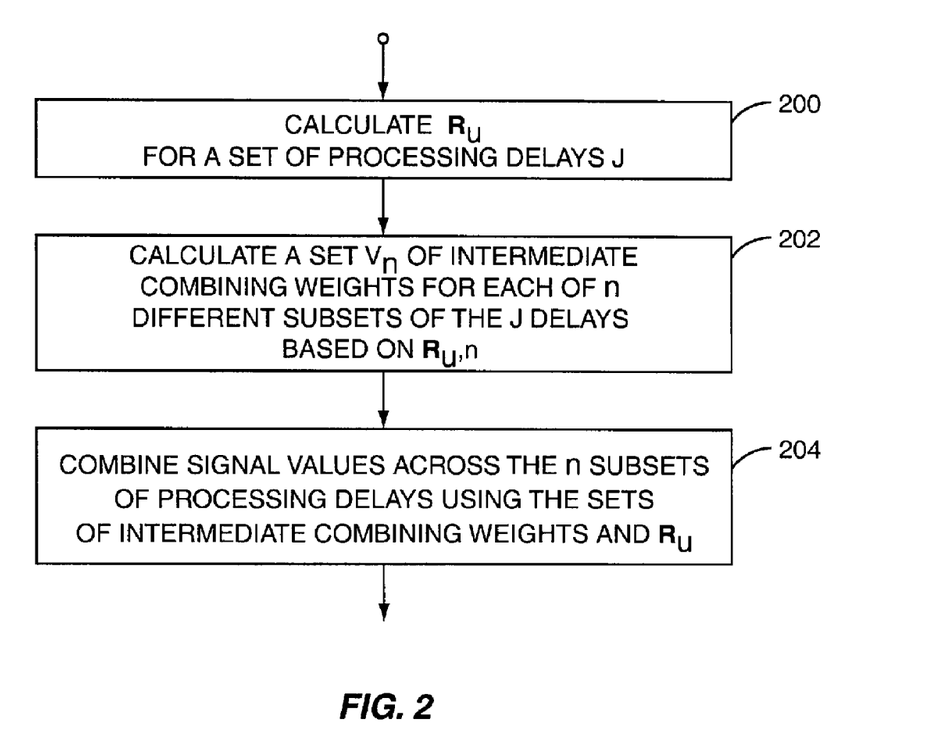
FIG. 2 is a logic flow diagram of an embodiment of processing logic for calculating combining weights in multiple stages.

Regardless, the multi-stage combining weight calculator 150 calculates a set of intermediate combining weights for each different subset of processing delays based on the system impairment covariance matrix $R_u$ as-if each subset contained the only delays used by the receiver 100, e.g., as illustrated by Step 202 of FIG. 2. As such, the entire system impairment covariance matrix $R_u$ is not inverted during the weight calculation process. In one embodiment, each set of intermediate combining weights is calculated based on the elements of the system impairment covariance matrix $R_{u,n}$ corresponding to the subset of processing delays for which the set of weights is being calculated. This way, only a portion of the system impairment covariance matrix $R_u$ is inverted to calculate each set of intermediate combining weights, reducing computational complexity while allowing the baseband processor 130 to use more processing delays. The baseband processor 130 combines the signal values derived across the subsets of processing delays using the sets of intermediate combining weights and the impairment covariance matrix $R_u$ to form a symbol detection decision metric, e.g., as illustrated by Step 204 of FIG. 2.

In one embodiment, the multi-stage weight calculator 150 calculates a final set of combining weights based on the sets of intermediate combining weights previously calculated and the impairment covariance matrix $R_u$. According to this embodiment, the baseband processor 130 forms the symbol detection decision metric by combining the signal values derived across the subsets of processing delays using the final set of combining weights.

Regardless, the combining weights can be calculated using any desired system of linear equations. In one embodiment, the combining weights are calculated based on the system of linear equations given by expression (2) where the system impairment covariance matrix $R_u$ and channel response estimate H are calculated by the baseband processor 130 as is well known in the art. In another embodiment, the combining weights are calculated using a weighted least-squares system of equations given by:

$$W = R_u^{-1} H (H^H R_u^{-1} H)^{-1} \quad (3)$$

where W is a vector of combining weights. Either way, the combining weights are calculated in at least two stages by segmenting the processing delays into overlapping or non-overlapping subsets and calculating intermediate combining weights based on the different subsets of processing delays. This way, full inversion of the entire system impairment covariance matrix $R_u$ is avoided, reducing computational complexity of the receiver 100. In one embodiment, the receiver 100 is a G-RAKE receiver.

Figure 3:
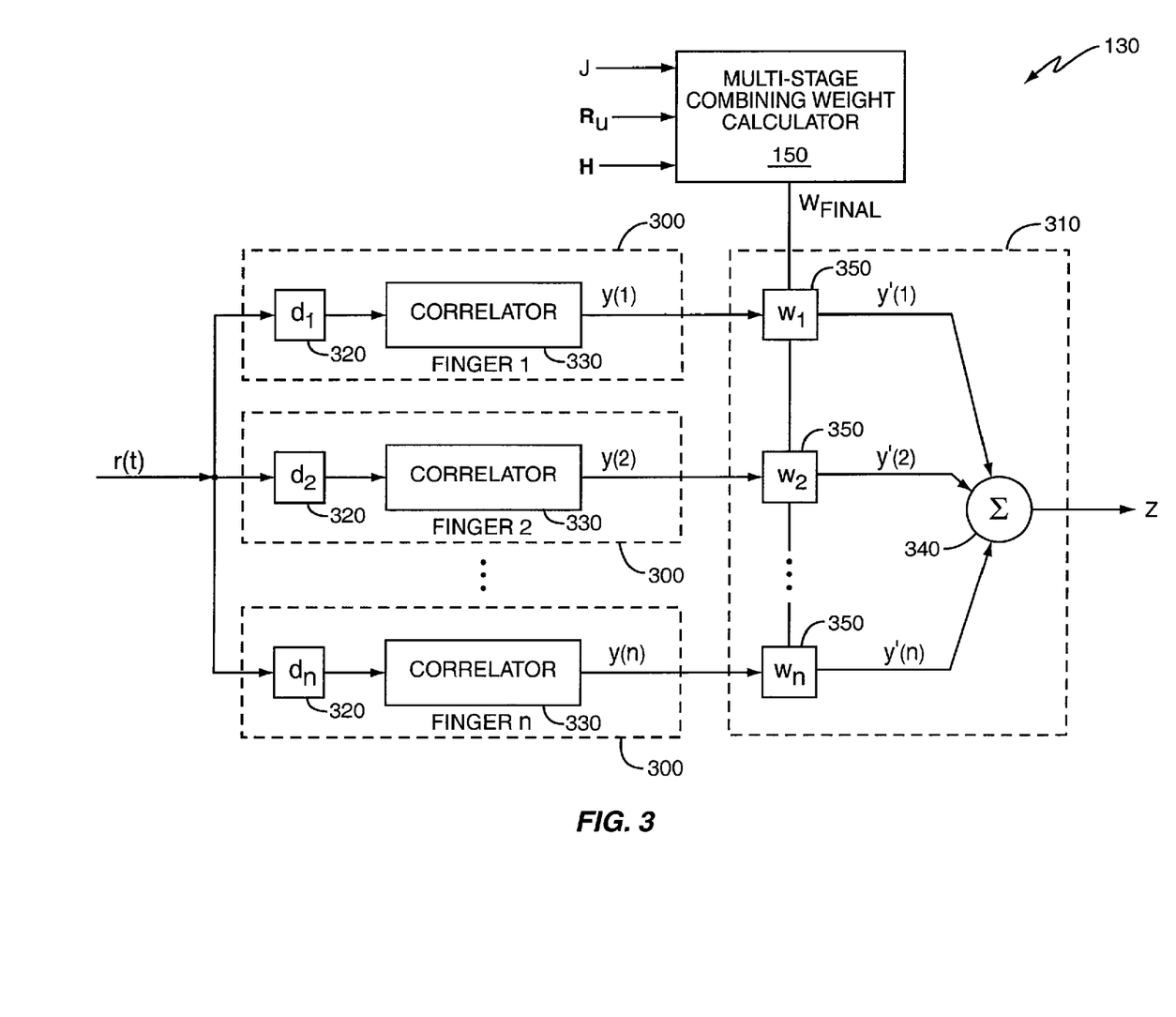
FIG. 3 is a block diagram of an embodiment of a G-RAKE wireless receiver including a multi-stage combining weight calculator.

FIG. 3 illustrates a G-RAKE embodiment of the baseband processor 130. According to this embodiment, the baseband processor 130 includes a plurality of signal processing fingers 300 and a combiner stage 310. Each finger 300 includes a delay block 320 having a delay $d_n$ corresponding to one of the processing delays included in the delay subsets. A spreading waveform correlator 330 included in each finger 300 de-spreads the correspondingly delayed baseband signal using an assigned channelization code as is well known in the art. Signal values (y(1), y(2), ..., y(n)) derived by the fingers 300 across the subsets of processing delays are provided to the signal combiner stage 310 for weighting and combining. The signal combiner stage 310 includes a signal combiner 340 and a weighting block 350 coupled to each finger output. Each signal value is weighted by one of the weighting blocks 350 using a final weight value ($W_{FINAL}(1)$, $W_{FINAL}(2)$, ..., $W_{FINAL}(n)$) derived by the multi-stage combining weight calculator 150. The weighted signal values (y'(1), y'(2), ..., y'(n)) are combined by the signal combiner 340 to form a decision metric (z). The baseband processor 130 uses the decision metric to make symbol detection decisions.

Figure 4:
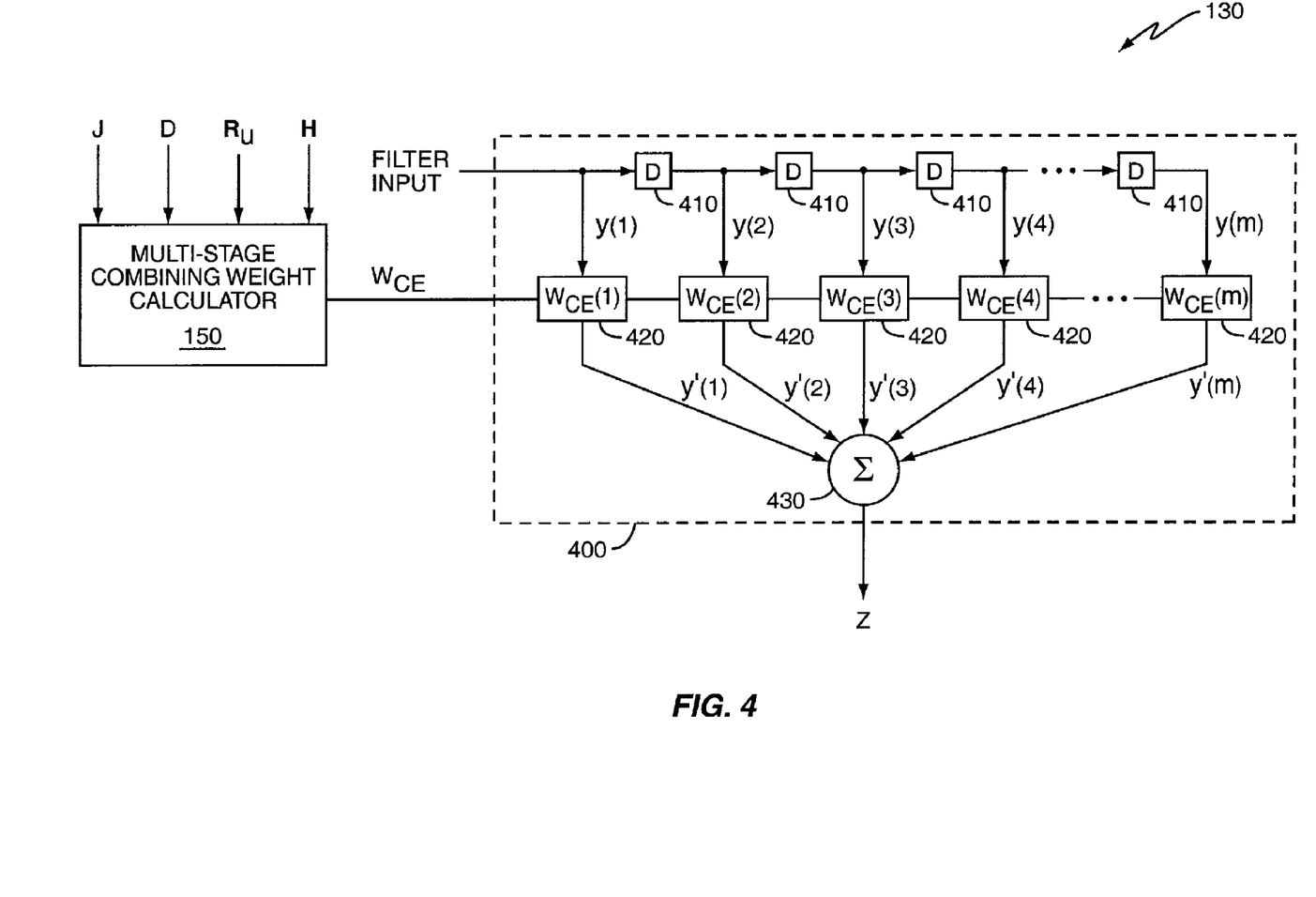
FIG. 4 is a block diagram of an embodiment of a chip equalizer wireless receiver including a multi-stage combining weight calculator.

FIG. 4 illustrates a chip equalizer embodiment of the baseband processor 130. According to this embodiment, the baseband processor 130 includes a multi-transversal filter 400. The filter input may be the baseband signal itself or an output from a previous G-RAKE stage (not shown). Either way, the filter 400 includes a plurality of filter taps 410 having a delay D (e.g., D=¾ chip). The signal values (y(1), y(2), ..., y(m)) output by the delay blocks 410 are weighted by respective weighting blocks 420 using chip equalizer weight values ($W_{CE}(1)$, $W_{CE}(2)$, ..., $W_{CE}(m)$) computed by the multi-stage combining weight calculator 150. $W_{CE}$ is computed by placing element i of $W_{FINAL}$ at position j where (j−1)*D is equal to the processing delay of element j. The rest of the positions in $W_{CE}$ are filled with zeros. A signal combiner 430 sums the weighted signal values (y'(1), y'(2), ..., y'(m)) to form the symbol detection decision metric (z). In either the G-RAKE or chip equalizer embodiments, the final set of combining weights $W_{FINAL}$ used for signal combining are calculated in at least two stages so that the entire system impairment covariance matrix $R_u$ does not have to be inverted to calculate the weights.

Operation of the multi-stage combining weight calculator 150 is described next in more detail beginning with a single transmit/single receive antenna transmission configuration (SISO). Other signal transmission configurations are then explained, building on the SISO embodiment. With this understanding, some or all of the J processing delays used by the baseband processor 130 are grouped into at least two subsets of delays. For ease of explanation only, the SISO embodiment is described herein with reference to two non-overlapping subsets of delays. However, the processing delays may be grouped into any number of overlapping or non-overlapping subsets. A permutation matrix is formed for each different subset of delays as given by:

$$P_0 = [I_{f0 \times f0} \; 0_{f0 \times f1}] \quad (4)$$

$$P_1 = [0_{f1 \times f0} \; I_{f1 \times f1}] \quad (5)$$

where the permutation matrix entries are either zero or one, f0 and f1 are the number of processing delays in the first and second subsets, respectively, and f0+f1=f where f represents the total number of the J processing delays grouped into subsets. Using a permutation matrix P is but one of many embodiments that may be employed to form the different delay subsets. In view of the delay groupings, the linear system of equations represented by expression (1) becomes:

$$P_0 Y = P_0 H s + P_0 U \quad (6)$$

and $$P_1 Y = P_1 H s + P_1 U \quad (7)$$

where Y is a vector of signal values derived by the baseband processor 130 using the f processing delays (e.g., G-RAKE finger or filter tap delays), H is a vector of f complex channel responses, s is the symbol of interest and U is a vector of f dependent Gaussian noises (plus interference) having a corresponding system impairment covariance matrix $R_u$.

The covariance matrices for $P_0U$ and $P_1U$ are $P_0R_uP_0^H$ and $P_1R_uP_1^H$, respectively. Applying expression (2) to expression (6) results in an intermediate combining weight vector of $(P_0R_uP_0^H)^{-1}P_0H$ when expressed for the first subset of processing delays. Using $P_0^H$, the intermediate combining weight vector for the first delay subset can be expressed, having a length and order corresponding to the non-partitioned delays of expression (1), as:

$$V_0 = P_0^H(P_0R_uP_0^H)^{-1}P_0H \tag{8}$$

The intermediate combining weight vector for the second subset of processing delays is similarly given by:

$$V_1 = P_1^H(P_1R_uP_1^H)^{-1}P_1H \tag{9}$$

Expression (1) can be transformed using a transformation matrix V as given by:

$$VY = VHs + VU \tag{10}$$

where $$V^H = [V_0 V_1] \tag{11}$$

and the covariance matrix of VU is $VR_uV^H$. The multi-stage weight calculator 150 then calculates a second stage of combining weights given by:

$$W_{2nd} = (VR_uV^H)^{-1}VH \tag{12}$$

When the second stage weights $W_{2nd}$ are applied to the intermediate signal values VY, the expression $W_{2nd}^H VY$ implies that $W_{FINAL}^H = W_{2nd}^H V$, giving:

$$W_{FINAL}^H = W_{2nd}^H = V^H(VR_uV^H)^{-1}VH \tag{13}$$

$W_{FINAL}^H$ represents the final two-stage approximate combining weight vector for the system of expression (1). Although expression (13) appears more complicated than expression (2), the multi-stage weight calculation process in many cases saves a considerable amount of signal processing computations. Furthermore, the multi-stage weight calculation process allows for multiple matrix inversions to be performed in parallel. Alternatively, the second stage weights $W_{2nd}^H$ can be applied to the intermediate signal values VY as described above. This approach may be advantageous when hardware that computes the intermediate signal values VY is available.

For illustrative purposes only, consider the following non-limiting example. The baseband processor 130 may have the capability of employing eleven processing delays for performing channel estimation and signal de-spreading. However, the baseband processor 130 may be limited to forming and inverting a single 8×8 impairment covariance matrix $R_u$ during any one processing slot. Expressions (1) and (2) correspondingly reduce to:

$$Y_{0-10} = H_{0-10}s + U_{0-10} \tag{14}$$

and $$W_{0-10} = R_{u0-10}^{-1} H_{0-10} \tag{15}$$

The multi-stage combining weight calculator 150 performs weight calculation in two stages for two overlapping subsets of eight processing delays each. Expressions (4)-(5) and (8)-(9) respectively yield:

$$P_{0-7} = [I_{8\times 8} \ 0_{8\times 3}] \tag{16}$$

$$P_{3-10} = [0_{8\times 3} \ I_{8\times 8}] \tag{17}$$

$$V_{0-7} = P_{0-7}^H(P_{0-7}R_uP_{0-7}^H)^{-1}P_{0-7}H_{0-7} \tag{18}$$

$$V_{3-10} = P_{3-10}^H(P_{3-10}R_uP_{3-10}^H)^{-1}P_{3-10}H_{3-10} \tag{19}$$

Since the baseband processor 130 forms a single 8×8 $R_u$ matrix per slot in this non-limiting example, expressions (18) and (19) reduce to:

$$V_0 = P_{0-7}^H(R_{u0-7})^{-1}P_{0-7}H_{0-7} \tag{20}$$

$$V_1 = P_{3-10}^H(R_{u3-10})^{-1}P_{3-10}H_{3-10} \tag{21}$$

Expression (13) then becomes:

$$W_{FINAL} = V^H(VR_{u0-10}V^H)^{-1}VH_{0-10} \tag{22}$$

The term $VR_{u0-10}V^H$ in expression (22) can be further simplified because $R_{u0-10}$ is too large per slot in this non-limiting example. The expression $VR_{u0-10}V^H$ is a symmetric 2×2 matrix having three unique elements. Moreover, $V_0$ has zeros in positions 8-10 and $V_1$ has zeros in positions 0-2, giving:

$$R_{V0,0} = V_0^H R_{u0-10} V_0 = V_{0,0-7}^H R_{u0-7} V_{0,0-7} \tag{23}$$

and $$R_{V1,1} = V_1^H R_{u0-10} V_1 = V_{1,3-10} R_{u3-10} V_{1,3-10} \tag{24}$$

$R_{V0,0}$ and $R_{V1,1}$ can be calculated within their "own" respective slots and may each be stored as a single complex 1×1 scalar until further use. $R_{V0,1}$ is slightly more complicated because it depends on elements from $V_0$, $V_1$, $R_{u0-7}$ and $R_{u3-10}$, which are not all calculated within the same slot. If $V_0$ is calculated in a first slot and is to be combined with $V_1$ that is calculated in a second subsequent slot, the following expressions follow:

$$\begin{aligned} R_{V0,1} &= V_0^H R_{u0-10} V_1 \\ &= V_{0,0-7}^H R_{u0-7,3-10} V_{1,3-10} \\ &= V_{0,0-7}^H [R_{u0-7,3-7} \ ; \ R_{u0-7,8-10}] V_{1,3-10} \end{aligned} \tag{25}$$

and $$V_{0,0-7}^H R_{u0-7,8-10} = V_{0,0-2}^H R_{u0-2,8-10} + V_{0,3-7}^H R_{u3-7,8-10} \tag{26}$$

If $R_{VTEMP0} = V_{0,0-7}^H R_{u0-7,3-7}$ has been calculated, $R_{u0-7}$ is no longer needed and can be discarded. Moreover, the term $V_{0,0-2}^H R_{u0-2,8-10}$ in expression (25) can be neglected because $R_{u0-2,8-10}$ is not calculated during either the first or second slot. In one embodiment, the processing delays are chosen so that $R_{u0-2,8-10}$ is near zero, i.e. delays 0-2 are not correlated with delays 8-10. During the second slot, $R_{VTEMP1} = V_{0,3-7}^H R_{u3-7,8-10}$ is calculated and $R_{V0,1}$ is set approximately equal to:

$$R_{V0,1} \approx [R_{VTEMP0} R_{VTEMP1}] V_{1,3-10} \tag{27}$$

From here, $R_V$ can be constructed and the final set of combining weights calculated as given by:

$$W_{FINAL} = V^H(R_V)^{-1}VH_{0-10} \tag{28}$$

The SISO embodiment explained above represents a two-stage weight calculation process. The two-stage weight calculation process naturally extends to any desired number of stages. In one embodiment, expression (10) and its covariance matrix is of the same form as expression (1). The covariance matrix of expression (10) can be used as a modified input to one or more additional intermediate combining weight stages represented by expressions (4)-(12). This yields multiple intermediate weight calculation stages, each using a different partitioning of delays. The number of delay partitions preferably decreases from stage-to-stage, eventually yielding a final set of combining weights as given by expression (13). Moreover, a different linear system of equations other than expression (2) may be employed. In one embodiment, combining weights are calculated using the weighted least squares system of linear equations given by expression (3) during the different weight calculation stages.

In a non-SISO embodiment, the receiver 100 can be configured to operate in a multiple transmit/single receive antenna configuration (MISO) having transmitter diversity. According to the MISO embodiment, the system model may be expressed as:

$$Y = H_0 s + H_1 s + U = [H_0 + H_1] s + U \qquad (29)$$

where $H_0$ and $H_1$ are vectors of f complex system responses associated with the first and second transmit antennas (not shown), respectively. $H_0$ and $H_1$ can be expressed as:

$$H = H_0 + H_1 \qquad (30)$$

and the final set of combining weights $W_{FINAL}$ can be calculated for the MISO system based on expressions (4)-(13).

In yet another non-SISO embodiment, the receiver 100 is configured to operate in a single transmit/multiple receive antenna configuration (SIMO) having receiver diversity. According to the SIMO embodiment, the system model still corresponds to expression (1). However, the grouping of processing delays is not necessarily the same as that given by expressions (5) and (6). Assuming that the processing delays are ordered receiver-wise in Y, permutation matrices that group the delays according to similarity in delay times can be expressed as:

$$P_0 = \lfloor I_{f00 \times f00} \ 0 \ 0 \ 0; 0 \ 0 \ I_{f01 \times f01} \ 0 \rfloor \qquad (31)$$

$$P_1 = \lfloor 0 \ I_{f10 \times f10} \ 0 \ 0; 0 \ 0 \ 0 \ I_{f11 \times f11} \rfloor \qquad (32)$$

where, for a true partition of delays, f00+f01+f10+f11=f. Optionally, f00=f01 and f10=f11.

In still another non-SISO embodiment, the receiver 100 is configured to operate in a multiple transmit/multiple receive antenna configuration (MIMO) having both transmitter and receiver diversity. In one embodiment, signal is still transmitted to the receiver 100 using a single data stream. As such, the system model is once again given by expression (1). Also, the processing delays may be grouped the same way as in the SIMO embodiment.

In another MIMO embodiment, the signal is transmitted to the receiver 100 using at least two different data streams sharing a common set of channelization codes. Such a signal transmission scheme is commonly referred to as dual-transmit adaptive antennas (D-TxAA). According to this embodiment, expression (1) is modified to indicate that at least two different data streams having the same channelization codes carry data symbols of interest as given by:

$$Y = H_0 s_0 + H_1 s_1 + U \qquad (33)$$

where $s_0$ and $s_1$ are data symbols of the first and second streams, respectively. As seen by expression (33), the vector Y of signal values is affected by the data symbols of both data streams. This is commonly referred to as code reuse interference because the same set of channelization codes are used to encode both streams. When the data streams are to be marginally detected, i.e. not simultaneously detected, a separate model can be used for each data stream where the "other" stream is treated as noise that is added to U according to statistical properties, e.g., as given by:

$$Y = H_0 s_0 + (H_1 s_1 + U) \qquad (34)$$

$$Y = H_1 s_1 + (H_0 s_0 + U) \qquad (35)$$

From a combining weight calculation perspective, expressions (34) and (35) can be treated as two separate systems of the same kind as the SIMO receiver diversity embodiment previously described herein. However, such an approach requires one inversion of the impairment covariance matrix associated with the second data stream ($R_{H1s1+U}$) and another inversion of the impairment covariance matrix associated with the first data stream ($R_{H0s0+U}$). In a different embodiment, expressions (34) and (35) can be solved using one common matrix inversion which is computationally less intensive and based on the Rank 1 matrix update.

In more detail, the Rank 1 matrix update can be performed by calculating the combining weights for the system of expression (33) using a two-step process. In the first step, a first intermediate combining weight vector $V_0$ is calculated for the first data stream (symbol $s_0$) and a second intermediate combining weight vector $V_1$ is calculated for the second data stream (symbol $s_1$) as given by:

$$V_0 = R_u^{-1} H_0 \qquad (36)$$

and $$V_1 = R_u^{-1} H_1 \qquad (37)$$

Each respective combining weight vector $V_0, V_1$ is calculated in accordance with expressions (4)-(13). Expression (13) gives $V_0$ and $V_1$ based on the system impairment covariance matrix $R_u$ because two data streams are transmitted instead of one.

The second stage of the Rank 1 matrix update involves calculating a set of final combining weights $W_{FINAL,0}/W_{FINAL,1}$ for each data stream based on $V_0$ and $V_1$, respectively. In one embodiment, the set of final combining weights associated with each data stream is given by:

$$W_{FINAL,0} = V_0 - k_0 V_1 \qquad (38)$$

and $$W_{FINAL,1} = V_1 - k_1 V_0 \qquad (39)$$

where $k_0$ and $k_1$ are scalars given by:

$$k_0 = \frac{\alpha_{PC}(1) V_1^H H_{\text{eff}}(b_0)}{1 + \alpha_{PC}(1) V_1^H H_{\text{eff}}(b_1)} \qquad (40)$$

$$k_1 = \frac{\alpha_{PC}(0) V_0^H H_{\text{eff}}(b_1)}{1 + \alpha_{PC}(0) V_0^H H_{\text{eff}}(b_0)} \qquad (41)$$

In expressions (40) and (41), $b_n$ represents the preceding vector associated with data stream n, $H_{\text{eff}}(b_n)$ represents the channel response estimate associated with data stream n, and $\alpha_{PC}(n)$ is an interference scaling factor that is a function of the precoding configuration for data stream n.

One embodiment of interlacing the multi-stage weight calculation process with the two-step Rank 1 matrix update process represented by expressions (36)-(41) involves two iterations of the multi-stage weight calculation process. During a first iteration, a set of intermediate combining weights are calculated for each subset of processing delays based on $R_u$ and $H_{\text{eff}}(b_0)$ for the first data stream, e.g., in accordance with equations (4)-(9). A final set $V_0$ of intermediate combining weights is then calculated for the first data stream based on the sets of intermediate combining weights calculated during the first iteration, e.g., in accordance with equations (12), (13) and (36). Sets of intermediate combining weights and a final set of intermediate combining weights $V_1$ are calculated in a similar way for the second data stream during a second iteration of the multi-stage weight calculation process. Sub-matrices of $R_u$ that were inverted during the first iteration can be re-used during the second iteration. The final sets of intermediate combining weights $V_0/V_1$ are then linearly combined to obtain a set of final combining weights $W_{FINAL,0}/W_{FINAL,1}$ for the first and second data streams according to expressions (38) and (39), respectively. In one embodiment, $V_0$ can be calculated by linearly combining the sets of intermediate combining weights calculated during the first iteration, e.g., in accordance with expression (38). The vector $V_1$ can be similarly calculated by linearly combining the sets of intermediate combining weights calculated during the second iteration.

Another embodiment of interlacing the multi-stage weight calculation process with the two-step Rank 1 matrix update process involves calculating the sets of intermediate combining weights for both data streams in a first stage and calculating the respective final set of intermediate combining weights in a subsequent stage. In more detail, a set of intermediate combining weights is calculated for each subset of processing delays based on $R_u$ and $H_{eff}(b_0)$ for the first data stream. Additional sets of intermediate combining weights are similarly calculated based on $R_u$ and $H_{eff}(b_1)$ for the second data stream. During the second stage, a final set $V_0$ of intermediate combining weights is calculated for the first data stream based on the sets of intermediate combining weights previously calculate in the first stage for the first data stream. The calculations result in one vector of intermediate combining weights for each subset of processing delays. A final set $V_1$ of intermediate combining weights is similarly calculated for the second data stream.

The final sets of intermediate combining weights $V_0/V_1$ are then linearly combined to obtain a set of final combining weights $W_{FINAL,0}/W_{FINAL,1}$ for the first and second data streams according to equations (38) and (39), respectively. In one embodiment, $V_0$ can be calculated by linearly combining the sets of intermediate combining weights calculated in the first stage for the first data stream. The vector $V_1$ can be similarly calculated by linearly combining the corresponding sets of intermediate combining weights calculated in the first stage for the second data stream. Thus, code-reuse correction is performed after the first and second stages because the Rank 1 matrix update operation is performed after each stage. This corrects errors that occur when the Rank 1 matrix update is performed after the first stage and creates additional, previously neglected, covariance matrix elements having been introduced by the transformations with V at the second stage.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of processing a received signal, comprising:
    calculating an impairment covariance matrix for a set of processing delays used to derive a plurality of signal values from the received signal, the received signal transmitted using at least two different data streams sharing a common set of channelization codes;
    during a first iteration, calculating a set of intermediate combining weights for each of at least two different subsets of the processing delays based on a channel response estimate and impairment covariance matrix corresponding to a first one of the data streams and calculating a final set of intermediate combining weights for the first data stream based on the sets of intermediate combining weights calculated during the first iteration;
    during a second iteration, calculating a set of intermediate combining weights each of the at least two different subsets of processing delays based on a channel response estimate and impairment covariance matrix corresponding to a second one of the data streams and calculating a final set of intermediate combining weights for the second data stream based on the sets of intermediate combining weights calculated during the second iteration;
    linearly combining the final sets of intermediate combining weights to obtain a set of final combining weights for the first and second data streams; and
    combining the signal values derived across the subsets of processing delays using the set of final combining weights.

2. The method of claim 1, further comprising:
    correlating different ones of the processing delays; and
    forming the at least two different subsets of processing delays based on the correlation results.

3. The method of claim 2, wherein correlating different ones of the processing delays comprises calculating a delay time difference between different ones of the processing delays.

4. The method of claim 1, wherein calculating a set of intermediate combining weights for each of the at least two different subsets of processing delays comprises calculating each set of intermediate combining weights based on the impairment covariance matrix elements corresponding to the processing delays included in the subset for which the set of intermediate combining weights is being calculated.

5. The method of claim 1, wherein the sets of intermediate combining weights are calculated based on a weighted least-squares system of linear equations.

6. The method of claim 1, further comprising skipping calculation of the sets of intermediate combining weights and calculating a final set of combining weights based on an inversion of the entire impairment covariance matrix when signal processing resources are available for inverting the entire impairment covariance matrix, signal reception quality is relatively poor and/or the data symbols are transmitted at a relatively high speed.

7. The method of claim 1, wherein calculating the final set of intermediate combining weights for the first data stream comprises linearly combining the sets of intermediate combining weights calculated during the first iteration and wherein calculating the final set of intermediate combining weights for the second data stream comprises linearly combining the sets of intermediate combining weights calculated during the second iteration.

8. The method of claim 1, wherein calculating the sets of intermediate combining weights and the final set of combining weights comprises:
    in a first stage, calculating a set of intermediate combining weights for each subset of processing delays based on the channel response estimate and impairment covariance matrix corresponding to the first data stream and calculating a set of intermediate combining weights for each subset of processing delays based on the channel response estimate and impairment covariance matrix corresponding to the second data stream;
    during a second stage, calculating the final set of intermediate combining weights for the first data stream based on the sets of intermediate combining weights corresponding to the first data stream and calculating the final set of intermediate combining weights for the second data stream based on the sets of intermediate combining weights corresponding to the second data stream; and
    linearly combining the final sets of intermediate combining weights to obtain the set of final combining weights for the first and second data streams.

9. The method of claim 8, further comprising performing code-reuse correction between the first and second stages.

10. The method of claim 1, wherein combining the signal values derived across the subsets of processing delays using the set of final combining weights comprises:
    calculating intermediate signal values based on the signal values and the sets of intermediate combining weights; and combining the intermediate signal values using the set of final combining weights.

11. A receiver comprising a baseband processor operable to:
- calculate an impairment covariance matrix for a set of processing delays used to derive a plurality of signal values from a received signal transmitted using at least two different data streams sharing a common set of channelization codes;
- during a first iteration, calculate a set of intermediate combining weights for each of at least two different subsets of the processing delays based on a channel response estimate and impairment covariance matrix corresponding to a first one of the data streams and calculating a final set of intermediate combining weights for the first data stream based on the sets of intermediate combining weights calculated during the first iteration;
- during a second iteration, calculate a set of intermediate combining weights each of the at least two different subsets of processing delays based on a channel response estimate and impairment covariance matrix corresponding to a second one of the data streams and calculating a final set of intermediate combining weights for the second data stream based on the sets of intermediate combining weights calculated during the second iteration;
- linearly combine the final sets of intermediate combining weights to obtain a set of final combining weights for the first and second data streams; and
- combine the signal values derived across the subsets of processing delays using the set of final combining weights.

12. The receiver of claim 11, wherein the baseband processor is operable to correlate different ones of the processing delays and form the at least two different subsets of processing delays based on the correlation results.

13. The receiver of claim 12, wherein the baseband processor is operable to calculate a delay time difference between different ones of the processing delays and form the at least two different subsets of processing delays based on the delay time difference calculations.

14. The receiver of claim 11, wherein the baseband processor is operable to calculate each set of intermediate combining weights based on the impairment covariance matrix elements corresponding to the processing delays included in the subset for which the set of intermediate combining weights is being calculated.

15. The receiver of claim 11, wherein the baseband processor is operable to calculate the sets of intermediate combining weights based on a weighted least-squares system of equations.

16. The receiver of claim 11, wherein the baseband processor is operable to skip calculation of the sets of intermediate combining weights and calculate a final set of combining weights based on an inversion of the entire impairment covariance matrix when signal processing resources are available for inverting the entire impairment covariance matrix, signal reception quality is relatively poor and/or the data symbols are transmitted at a relatively high speed.

17. The receiver of claim 11, wherein the baseband processor is operable to linearly combine the sets of intermediate combining weights calculated during the first iteration and linearly combine the sets of intermediate combining weights calculated during the second iteration to obtain the set of final combining weights.

18. The receiver of claim 11, wherein the baseband processor is operable to:
- in a first stage, calculate a set of intermediate combining weights for each subset of processing delays based on the channel response estimate and inverted impairment covariance matrix corresponding to the first data stream and calculate a set of intermediate combining weights for each subset of processing delays based on the channel response estimate and inverted impairment covariance matrix corresponding to the second data stream;
- during a second stage, calculate the final set of intermediate combining weights for the first data stream based on the sets of intermediate combining weights corresponding to the first data stream and calculate the final set of intermediate combining weights for the second data stream based on the sets of intermediate combining weights corresponding to the second data stream; and
- linearly combine the final sets of intermediate combining weights to obtain the set of final combining weights for the first and second data streams.

19. The receiver of claim 11, wherein the baseband processor comprises a plurality of signal processing fingers operable to derive the plurality of signal values, each signal processing finger having a delay corresponding to one of the processing delays included in the at least two different subsets of processing delays, and a signal combiner operable to combine the signal values derived by the signal processing fingers across the subsets of processing delays using the set of final combining weights.

20. The receiver of claim 11, wherein the baseband processor comprises a plurality of filter taps operable to derive the plurality of signal values, each filter tap having a delay corresponding to one of the processing delays included in the at least two different subsets of processing delays, and a signal combiner operable to combine the signal values derived by the filter taps across the subsets of the processing delays using the set of final combining weights.

21. The receiver of claim 11, wherein the baseband processor is operable to:
- calculate intermediate signal values based on the signal values and the sets of intermediate combining weights; and
- combine the intermediate signal values using the set of final combining weights.

* * * * *